3,546,219
Patented Dec. 8, 1970

3,546,219
3-AZIDOMETHYL - 7-ARYLGLYOXAMIDOCEPH-3-EM-4-CARBOXYLIC ACIDS AND THEIR SALTS AND α-CARBONYL DERIVATIVES
Alan Gibson Long, Greenford, Edward McKenzie Wilson, Hayes, and William Graham, Pinner, England, assignors to Glaxo Laboratories Limited, Greenford, England, a British company
No Drawing. Filed Mar. 14, 1968, Ser. No. 712,963
Claims priority, application Great Britain, Mar. 23, 1967, 13,868/67
Int. Cl. C07d *99/24*
U.S. Cl. 260—243                                       5 Claims

---

ABSTRACT OF THE DISCLOSURE

The invention relates to antibiotics which are compounds of the formula

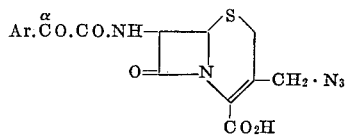

in which Ar represents an aromatic group, and their pharmaceutically acceptable salts and α-carbonyl derivatives.

---

This invention is concerned with improvements in or relating to derivatives of Cephalosporin C. The antibiotic Cephalosporin C is a derivative of the bicyclic compound cepham, which has the structure

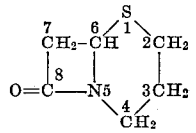

(see J.A.C.S., 84 (1962), page 3400) and is numbered as indicated. The systematic names used herein for the cephalosporin derivatives are based on this molecular structure.

Most antibiotics prepared up to the present, which have the 3,4-dehydrocepham structure, are administered parenterally, the compounds by the oral route being either only feebly active, or totally inactive. The invention concerns compounds which are active as antibiotics and are absorbed by the oral route as evidenced by animal tests. The compounds are also useful as intermediates in the preparation of other antibiotics.

According to the invention, therefore, we provide compounds of the formula

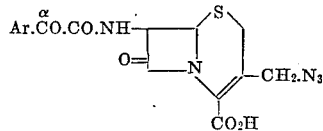

in which Ar represents an aromatic group, and their pharmaceutically acceptable salts. The invention also includes the α-carbonyl derivatives of all such compounds.

The group Ar in compounds of the Formula I preferably represents a phenyl or substituted phenyl group, but can also represent a heterocyclic aromatic group, e.g., 2- or 3-thienyl, -furyl or -pyrrolyl, dioxanyl, pyridyl or thiazolyl. Where Ar represents a substituted phenyl group, the substituent can be one or more fused benzene rings as in naphthyl and phenanthryl groups, e.g. Ar can represent a 1-naphthyl or 2-phenanthryl group. However, Ar preferably represents a group of the formula

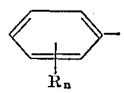

where R represents for example a substituted or unsubstituted amino group, a halogen atom, a lower alkyl, lower alkoxy or lower alkoxycarbonyl group, or a nitro or cyano group, and $n$ is 0 or an integer from 1 to 4. Where $n$ is greater than 1, the various groups R can be the same or different. Where R represents a substituted amino group, it can be for example a monoacylamino group, e.g., a lower alkanoylamino group (e.g. formamido or acetamido), or a mono- or di-(lower alkyl) amino group, e.g., a dimethylamino group. By the term "lower" as applied to alkyl, alkanoyl and alkoxy groups we mean such groups having 1 to 6, particularly 1 to 4, carbon atmos, e.g., methyl, methoxy, formyl and acetyl group.

The group Ar is most preferably a mono-, di-, or trisubstituted phenyl group, the substituents being one or more halogen atoms, especially chlorine or bromine atoms, methoxy groups, or nitro groups.

A compound according to the invention having particularly interesting antibiotic properties on account of its high activity against staphylococci, its high urinary recovery from female rats after oral administration and its $ED_{50}$ value against mice is the compound of the Formula I and pharmaceutically acceptable salts thereof, in which Ar represents p-chlorophenyl. Other interesting compounds are those which Ar represents p-bromophenyl; m-chlorophenyl; 2,5-dichlorophenyl; m-bromophenyl; o-chlorophenyl; o-bromophenyl; p-aminophenyl; phenyl or p-nitrophenyl.

Salts which may be used include (a) inorganic base salts such as alkali metal, e.g., sodium and potassium, ammonium, alkaline earth metal, e.g., calcium, salts and organic base salts, e.g., procaine and dibenzylethylene diamine salts and (b) when Ar contains a basic group and the compound exists as a Zwitterion, salts formed in (a) above or acid addition salts, e.g., with hydrochloric, sulphuric, nitric, phosphoric and citric acids. The salts may likewise be in the form of resinates, formed, e.g., with a polystyrene resin containing amino, quaternary amino or sulphonic acid groups, or a resin containing carboxyl groups, e.g., a polyacrylic acid resin. The resin may if desired be cross-linked, e.g., it may be a copolymer of styrene and divinylbenzene containing the appropriate groups.

The salts may be obtained from the free acid by reaction with an appropriate base.

When an α-carbonyl derivative of a compound of the Formula I is prepared, that α-carbonyl derivative is preferably the oxime, semicarbazone, thiosemicarbazone, isonicotinoylhydrazone, hydrazone or methoxime thereof.

The invention further provides a process for the preparation of compounds of the formula

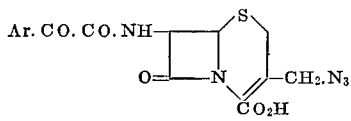

in which Ar is as hereinbefore defined (or a salt thereof), which comprises reacting a compound of the formula

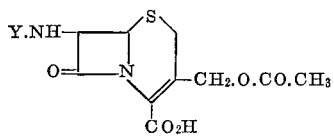

in which Y represents a hydrogen atom or the group Ar.CO.CO, where Ar is as hereinbefore defined, with a nucleophilic reagent serving to replace the acetoxy group by an azide group, to yield a compound of the formula

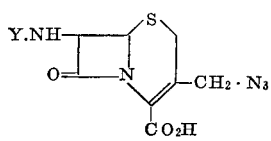

in which Y is as hereinbefore defined, or a salt thereof, followed by arylglyoxylation of the compound of the Formula III, or a salt thereof, in which Y represents a hydrogen atom to yield a compound of the Formula I.

Thus a compound of the Formula I can be prepared by acylating 7β-amino-3-azidomethyl-ceph-3-em-4-carboxylic acid with an aromatic glyoxylic acid Ar.CO.CO$_2$H or with an amide-forming derivative thereof. The acylation can be effected either with the acid itself, in the presence of an organic condensing agent, or with a reactive derivative of the acid.

Where the acid itself is used, the reaction is preferably carried out in aqueous or aqueous-organic solution in the presence of carbonyldi-imidazole or a carbodi-imide, e.g., N,N-diethyl-, N,N-dipropyl-, or N,N-di-isopropyl-carbodi-imide, or preferably N,N-dicyclohexyl-carbodi-imide.

Preferred reactive derivatives of the aromatic glyoxylic acid include activated esters, reactive azides, acid halides e.g. the acid chloride (where these are readily preparable e.g., phenylglyoxylic acid chloride), or anhydrides, e.g. mixed anhydrides. It is especially preferred to use as reactive derivative a mixed acid anhydride of the glyoxylic acid, e.g. the anhydride formed between the latter acid and butyric, valeric, isovaleric, trifluoroacetic, or pivalic acid, ethyl hydrogen carbonate or isobutyl hydrogen carbonate. The mixed alkyl anhydride can be prepared for example from the corresponding acid halide, preferably the chloride.

Preferred activated esters which couple directly with the 7β-amino group of 7β-amino-3-azidomethyl-ceph-3-em-4-carboxylic acid include esters of aromatic glyoxylic acids with p-nitrophenol, p-nitrothiophenol, or formaldehyde cyanhydrin.

The acylation of 7β-amino-3-azidomethyl-ceph-3-em-4-carboxylic acid with a reactive derivative of the aromatic glyoxylic acid is conveniently effected in the presence of an organic reaction medium, e.g., chloroform or methylene chloride, and a base, for example a tertiary organic base, e.g. pyridine or lower alkyl pyridines, or a triloweralkylamine. The lower alkyl groups each preferably have 1 to 5 carbon atoms, and the preferred triloweralkylamine is triethylamine. The reaction is preferably effected at −5 to +50° C.

7β-amino-3-azidomethyl-ceph-3-em-4-carboxylic acid may be prepared from 7-ACA (7β-aminocephalosporanic acid) by nucleophilic replacement of the acetoxy group by an azido group, e.g., with sodium azide, for example as described in British patent specification No. 1,012,943.

In place of 7β-amino-3-azidomethyl-ceph-3-em-4-carboxylic acid one can use an acid addition salt thereof and effect the acylation as described in British patent application No. 22,154/64 (Belgian Pat. No. 664,654).

Alternatively, a compound of the Formula I (hereinbefore defined) can be prepared by reacting a compound of the formula

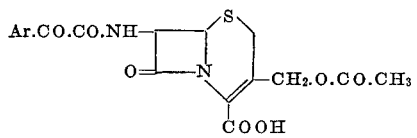

in which Ar is as hereinbefore defined, or a salt thereof, with an azide, e.g., sodium azide, whereby nucleophilic displacement of the acetoxy group by an azido group occurs. Suitable reaction conditions are described in British patent specification No. 1,012,943.

Compounds of the Formula IV can be prepared by acylation of 7-ACA with an aromatic glyoxylic acid, as hereinbefore described for the acylation of 7β-amino-3-azidomethyl-ceph-3-em-4-carboxylic acid with an aromatic glyoxylic acid, and as described in more detail in our copending application No. 712,962, filed of even date herewith.

The compound of the Formula I can be reacted under standard conditions with a ketone reagent, e.g., hydroxylamine, hydrazine, semicarbazide, thiosemicarbazide or isoniazide, to form the corresponding ketone derivative, e.g., oxime, hydrazone, semicarbazone, thiosemicarbazone, isonicotinoyl-hydrazone or methoxime.

Where the group Ar in the compound of Formula I contains an acylamino substituent, that acyl group can if desired be removed by hydrolysis, e.g., with concentrated hydrochloric acid at room temperature, to provide the corresponding amino compound.

The compounds according to the invention may be formulated for administration in any convenient way, by analogy with other antibiotics, e.g., penicillin or neomycin, and the invention therefore includes within its scope a pharmaceutical composition comprising at least one compound of the Formula I hereinbefore defined or α-carbonyl derivative or pharmaceutically acceptable salt thereof adapted for use in human or veterinary medicine. Such compositions may be presented for use in conventional manner with the aid of any necessary pharmaceutical carriers or excipients.

The invention therefore provides pharmaceutical compositions comprising, as active ingredient, at least one compound of the Formula I hereinbefore defined or α-carbonyl derivative or salt thereof in association with a pharmaceutical carrier or excipient. The compositions are preferably presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspensions, solutions, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin, hydroxyethyl-cellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilizing and/or dispersing agents. Alternatively the active ingredient may be in powder form for reconstitution with a suitable vehicle e.g. sterile, pyrogen-free water before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules in liquid or semi-solid form, or may be used as drops etc. Topical applications may be formulated in hydrophobic or hydrophilic bases as ointments, creams, lotions, paints, powders etc.

For veterinary medicine the composition may, for example, be formulated as an intramammary preparation in either long acting or quick-release bases.

The compositions may contain from 0.1% upwards, preferably from 10–60% of the active material, depending on the method of administration. Where the compositions comprise dosage units, each unit will preferably contain 50–500 mg. of the active ingredient. The dosage as employed for adult human treatment will preferably range from 100–3000 mg. for instance 1500 mg. per day, depending on the route and frequency of administration.

The compounds according to the invention may be administered in combination with other therapeutic agents such as antibiotics, for example other cephalosporins, the penicillins or tetracyclines.

The following examples illustrate the invention; the preparation of the arylglyoxylic acids and reactive derivatives thereof is sometimes more fully described in our copending application No. 712,962.

EXAMPLE 1

3-azidomethyl-7-phenylglyoxamidoceph-3-em-4-carboxylic acid

Phenylglyoxylic acid (30 g.), prepared by the method of Acree (Amer. Chem. J., 1913, 50, 389) was converted into phenylglyoxalyl chloride (17.2 g.) using oxalyl chloride as described by Kharasch and Brown (J.A.C.S., 1942, 64, 329).

Phenylglyoxalyl chloride (3.37 g., 0.02 mole) in ethyl acetate (20 ml.) and dimethylformamide (0.5 ml.) was added to 7-amino-3-azidomethylceph-3-em-4-carboxylic acid (5.08 g., 0.02 mole) in ethyl acetate (150 ml.). The suspension was stirred at room temperature for 1 hr., further acid chloride (0.34 g., 0.002 mole) was added, and stirring was continued for 30 min. The mixture was filtered and the filtrate treated with aniline (1.86 g., 0.02 mole). After 30 min. the mixture was extracted with 3% sodium bicarbonate (3× 50 ml.), and the basic extract washed with ethyl acetate (30 ml.) and then acidified to pH 1 with 2 N hydrochloric acid under a layer of ethyl acetate (30 ml.). The ethyl acetate layer was collected and combined with further ethyl acetate extracts (2× 30 ml.) of the aqueous layer. The combined extract was washed with water (2× 20 ml.) and brine (20 ml.), and dried (magnesium sulphate), and the solvent eliminated leaving the crude product as a gum. This was dissolved in acetone (50 ml.) and addition of dicyclohexylamine (3.62 g., 0.02 mole) caused the immediate separation of a crystalline precipitate. After 30 mins. at room temperature, this was collected by filtration, washed with acetone and ether and dried in vacuo giving dicyclohexylammonium 3 - azidomethyl - 7-phenylglyoxamido-ceph-3-em-4-carboxylate (8.71 g.). (Found (percent): C, 59.5; H, 6.4; N, 14.8; S, 5.6. $C_{28}H_{36}N_6O_5S$ requires (percent): C, 59.2; H, 6.4; N, 14.8; S, 5.7). A portion (4.10 g.) of this material was dissolved in warm 50% aqueous acetone (100 ml.), and the solution was acidified with 2 N hydrochloric acid and extracted with ethyl acetate (3× 100 ml.). This extract was washed with water and the solvent eliminated in vacuo leaving 3-azidomethyl-7-phenylglyoxamidoceph-3-em-4-carboxylic acid as a foam (2.65 g.), $[\alpha]_D^{20} + 86.5°$ (c., 1.08, dimethylsulphoxide);

$$\lambda_{max}.\ 255\ nm\ (E_{1\ cm}^{1\%}\ 501)$$

(Found (percent): C, 49.8; H, 3.6; N, 18.1; S, 8.3. $C_{16}H_{13}N_5O_5S$ requires (percent): C, 49.6; H, 3.4; N, 18.1; S, 8.3).

EXAMPLE 2

3-azidomethyl-7-(2'-semicarbazono)-phenylacetamido-ceph-3-em-4-carboxylic acid 3-azidomethyl-7β - phenylglyoxamidoceph - 3-em-4-carboxylic acid (1.936 g., 5 mmole) was dissolved in ethanol (25 ml.). To this was added semicarbazide hydrochloride (1.23 g. 11 m.mole) in water (25 ml.) and the pH of the solution was adjusted to 4.7 with sodium acetate solution. Thin-layer chromatography on silica using 50% benzene/methanol indicated virtual completion of the reaction after 24 hrs. The reaction mixture was acidified with 2 N HCl, extracted three times with ethyl acetate, and backwashed once with water. Evaporation of the dried organic phase yielded a solid (1.35 g.) of which 1.1 g. was recrystallised from glacial acetic acid to yield white crystals (767 mg.), M.P. 204–5°, $[\alpha]_D + 34.4°$ (c., 1.236, DMSO), $$\lambda\ max.\ 274\ nm.\ (E_{1cm}^{1\%}\ 377).$$

(Found: C, 45.7; H, 4.0; N, 23.0; S, 6.4. $C_{17}H_{16}N_8O_5S$. 0.75 $CH_3CO_2H$ requires C, 45.4; H, 3.9; N, 22.9; S, 6.55%).

EXAMPLE 3

3-azidomethyl-7β-(2'-thiosemicarbazono)-phenylacetamidoceph-3-em-4-carboxylic acid 3-azidomethyl-7β - phenylglyoxamidoceph - 3-em-4-carboxylic acid (1.935 g., 5 mmole) was dissolved in 50% ethanol/water (50 ml.). Thiosemicarbazide (1.0 g., 11 mmole) was added and the pH was adjusted to 4.7 with sodium acetate solution. The thiosemicarbazide dissolved only slowly under these conditions. After five days shaking at room temperature, the reaction mixture was worked up. The solution was acidified with 2 N HCl, extracted three times with ethyl acetate and the extracts backwashed once with water. The dried extracts were evaporated to a froth (1.98 g.), which was triturated with ether and filtered to yield a solid (1.25 g.). Recrystallisation of this solid from 50% aqueous isopropanol yielded white crystals (234 mg.), M.P. 188–190° (decomp.), $[\alpha]_D + 20.4°$ (c, 0.932, DMSO), λ max. 241, 310 nm. ($E^{1\%}_{1cm.}$ 427, 360 respectively).

(Found: C, 42.9; H, 3.8; N, 22.65; S, 13.78.

$$C_{17}H_{16}N_8O_4S_2 \cdot H_2O$$

requires C, 42.7; H, 3.8; N, 23.4; S, 13.4%).

EXAMPLE 4

Sodium salt of 3-azidomethyl-7-(thienyl-2'-glyoxamido)cept-3-em-4-carboxylic acid Thienyl-2-glyoxylic acid (3.12 g., 0.02 mole) prepared as described by Blicke and Tsao (J.A.C.S., 1944, 66, 1645) was suspended in methylene chloride (50 ml.) containing oxalyl chloride (2.54 g., 0.02 mole) and cooled to 0°. Dimethylformamide (8 drops) was cautiously added and after 30 min. at 0° the slowly effervescing stirred suspension was allowed to warm to and remain at room temperature for 1 hr., during which time complete solution was obtained. The solvent was evaporated leaving an orange oil which was dissolved in ethyl acetate (10 ml.) and added to a suspension of 7-amino-3-azidomethyl-ceph-3-em-4-carboxylic acid (2.55 g., 0.01 mole) in refluxing ethyl acetate (125 ml.). After 20 min. at reflux, by which time rapid darkening had begun, the suspension was cooled, filtered, and treated with aniline (2.79 g., 0.03 mole) for 1 hr. at room temperature. The reaction mixture was worked up as described in Example 1 to yield yellow acidic material (4.18 g.). This was dissolved in acetone (10 ml.) and a 10% w./v. solution of sodium 2-ethyl-hexanoate in acetone (30 ml.) was added. The resulting mixture was refrigerated for 1 hr., and then the precipitate was collected by filtration, washed with acetone (2× 10 ml.) and ether (2× 10 ml.), and dried in vacuo giving a yellow solid (2.7 g.). Dilution of the combined filtrate and washings with ether (400 ml.) gave further material (0.61 g.). The solids were dissolved in water (50 ml.) and the pH of the solution was adjusted to 2.0 under a layer of ethyl acetate (100 ml.). The ethyl acetate layer was collected and combined with the further ethyl acetate extracts (3× 50 ml.) of the aqueous layer. The total ethyl acetate solution was washed with water (15× 100 ml.) to remove thienyl-2-glyoxylic acid, then washed with brine (100 ml.) dried, and the solvent eliminated leaving a yellow foam. This was dissolved in acetone (10 ml.) and a 10% w./v. solution of sodium 2-ethyl-hexanoate in acetone (20 ml.) was added. The resulting mixture was refrigerated for 1 hr.; then the precipitate was collected by filtration, washed with acetone (2× 10 ml.) and ether (2× 10 ml.), and dried in vacuo giving as a yellow powder sodium 3-azidomethyl-7-(thienyl-2'-glyoxamido)ceph-3-em-4-carboxylate (1.32 g.); $[\alpha]^{21}_D + 104.4°$ (c., 1.04, water)

λ max. 266, 308 nm. ($E^{1\%}_{1cm.}$ 328, 211);

$R_f$ 0.21 (ethyl acetate/n-butanol/pH 5 buffer). (Found: C, 40.2; H, 2.8; N, 16.5; S, 15.3; $C_{14}H_{10}N_5O_5S_2Na$ requires C, 40.5; H, 2.4; N, 16.9; S, 15.4%).

EXAMPLE 5

Sodium 3-azidomethyl-7-(p-dimethylamino-phenylglyoxamido)-ceph-3-em-4-carboxylate 7-amino - 3 - azidomethyl-ceph-3-em-4-carboxylic acid (2.55 g., 0.01 mole) in dry acetonitrile (17.5 ml.) containing triethylamine (3 ml.) was treated at −5° with an ethereal solution of p-dimethylaminophenylglyoxalyl chloride, [prepared from dimethylaniline (6.25 ml.) according to Staudinger, Ber., 1909, 42, 3489]. The reaction was completed by stirring for 30 mins. at 5°.

Solid was removed by filtration and the filtrate evaporated to dryness under reduced pressure. The residual gum in ethyl acetate (50 ml.) was washed with water, dried over anhydrous magnesium sulphate and treated with cyclohexylamine (2 ml.). The solid was filtered off and dried in vacuo at room temperature. The salt (1.5 g.) was supended in water (30 ml.) and the pH adjusted to 2.5 with 2 N hydrochloric acid. The free acid was extracted into ethyl acetate and precipitated from the dry solution as its sodium salt by the addition of 10% sodium 2-ethylhexanoate in ethyl acetate. The solid was filtered off, washed with ethyl acetate and dried in vacuo for 15 hrs. to give sodium 3-azidomethyl-7-(p-dimethylaminophenylglyoxamido)ceph-3-em-4-carboxylate as a yellow solid (1.05 g., 23% theory) $[\alpha]^{20}_D + 133°$ (c., 1.0, pH 7 buffer)

λ max. 254 nm.($E^{1\%}_{1cm.}$ 319).

Paper chromatogram (ethyl acetate/n-butanol/buffer system) 1 spot, $R_F$ 0.48.

EXAMPLE 6

Coupling of p-chlorophenylglyoxylic acid with 7-amino-3-azidomethyl-ceph-3-em-4-carboxylic acid p-Chlorophenylglyoxylic acid (7.4 g., 0.04 mole) in a mixture of diethyl ether (140 ml.) and methylene chloride (100 ml.) containing triethylamine (5.6 ml.) was treated at 0° for 20 mins. with pivaloyl chloride (4.8 ml.). The precipitated triethylamine hydrochloride was removed by filtration and the filtrate added over 5 mins. to a cold (0°) solution of 7-amino-3-azidomethyl-ceph-3-em-4-carboxylic acid (10.2 g., 0.04 mole) in methylene chloride (200 ml.) containing triethylamine (14 ml.). The solution was kept at 0° for 1 hr. The solvents were removed by distillation under reduced pressure and the residue was partitioned between methylene chloride and water at pH 4.0. Any precipitated solid was filtered off and the two layers in the filtrate were separated. The aqueous layer was extracted with methylene chloride and the extracts were bulked with the organic layer. The resulting solution was washed with water and dried over anhydrous magnesium sulphate, and the solvent was then removed by distillation under reduced pressure. The residue was taken up in acetone (200 ml.) and treated with a 10% solution of sodium 2-ethyl-hexanoate in acetone (∼3 ml. per gram of residue). Precipitation was completed by stirring at 0° for 4 hrs. The solid was filtered off, washed with acetone and dried in vacuo to give sodium 3-azidomethyl - 7 - (p - chlorophenylglyoxamido)ceph - 3 - em-4-carboxylate in two crops (6.7 g.); $[\alpha]_D^{20} + 123.5$ (c., 1.0, pH 7 buffer);

λ max. 266 nm. ($E^{1\%}_{1cm.}$ 408).

(Found: C, 43.25; H, 2.6; Cl, 8.09; N, 15.4; S, 6.97. $C_{16}H_{11}ClN_5O_5NaS$ requires C, 43.3; H, 2.5; Cl, 8.0; N, 15.8; S, 7.2%). $R_F$ 0.85 single spot (ethyl acetate/n-butanol/pH 5 buffer).

EXAMPLES 7–33

The glyoxamido compounds listed in Table I were prepared substantially by the method described for Example 6 above. Methods for the preparation of the corresponding glyoxylic acids are described in our copending patent application No. 712,962.

TABLE 1

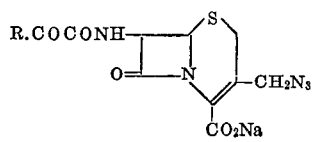

| Example No. | R represents— | Yield, percent | $\alpha_D^{20}$ | UV absorption $\lambda$max., nm. | E 1% 1 cm. | $R_F^2$ |
|---|---|---|---|---|---|---|
| 7 | p-Acetamidophenyl | 29 | +102 | 307 / 268 | 339 / 295 | 0.28 |
| 8 | p-Methoxyphenyl | 53 | +114 | 301 / 273 | 374 / 335 | 0.47 |
| 9 | p-Methylphenyl | 35 | +117 | 269 | 473 | 0.59 |
| 10 | p-Fluorophenyl | 49 | +124 | 263 | 433 | 0.36 |
| 11 | 2-methoxy-5-methylphenyl | ³ 31 | +90.5 | 264 | 316 | 0.54 |
| 12 | 2,4-dimethoxyphenyl | 32 | +91 | 276 | 289 | 0.23 |
| 13 | p-Bromophenyl | 63 | +112 | 270 | 357 | 0.51 |
| 14 | 2,5-dimethoxyphenyl | 11 | | 262 | 313 | 0.39 |
| 15 | m-Chlorophenyl | 9 | | 264 | 326 | 0.43 |
| 16 | 2,5-dichlorophenyl | 37 | +103 | 260 | 377 | 0.8 |
| 17 | m-Iodophenyl | 20 | | 263 | 240 | 0.58 |
| 18 | 5-chloro-2-methoxyphenyl | 16 | +98.7 | 260 | 237 | 0.46 |
| 19 | m-Bromophenyl | 17 | | 262 | 358 | 0.5 |
| 20 | o-Chlorophenyl | 15 | +118 | 260 | 324 | 0.69 |
| 21 | m-Methoxyphenyl | 12 | | 265 | 343 | 0.44 |
| 22 | o-Methoxyphenyl | 13 | +106 | 263 | 352 | 0.57 |
| 23 | 5-chloro-2-methoxy-4-methylphenyl | ⁴ 30 | | 262 | 372 | 0.51 |
| 24 | o-Bromophenyl | 33 | +111 | 262 | 278 | 0.45 |
| 25 | p-Nitrophenyl | ⁵ 30 | +131 | 266 | 406 | 0.47 |
| 26 | 3-chloro-6-methoxy-2,4-dimethylphenyl | 49 | +116 | 260 | 287 | 0.6 |
| 27 | 2,4-dichlorophenyl | 9 | +110 | 265 | 246 | 0.65 |
| 28 | o-Fluorophenyl | 9 | +103 | 260 | 360 | 0.55 |
| 29 | 4-chloro-3-nitrophenyl | 14 | +122 | 260 | 298 | 0.7 |
| 30 | 4-chloro-3-formamidophenyl | 13 | +112 | 242 / 268 | 362 / 304 | 0.2 |
| 31 | p-Formamidophenyl | ⁴ ⁶ 39 | | 304 | 352 | 0.34 |
| 32 | α-Naphthyl | 25 | | 252 | 394 | 0.63 |
| 33 | 2-phenanthryl | 56 | | 267 | 1040 | 0.65 |

¹ Concentration 1.0, pH 7 buffer.
² EtOAC/n-butanol/buffer system.
³ Isolated as the triethylamine salt.
⁴ Isolated as free acid.
⁵ Product precipitated from ethyl acetate solution of the free acid.
⁶ Tetrahydrofuran used as extraction solvent.

EXAMPLE 34

3-azidomethyl-7-(p-aminophenylglyoxamido)-ceph-3-em-4-carboxylic acid

3 - azidomethyl - 7 - (p-formamidophenylglyoxamido)-ceph-3-em - 4 - carboxylic acid (Example 31, 1.1 g.) in methanol (15 ml.) was acidified with concentated hydrochloric acid (1.5 ml.) and kept at room temperature for 30 mins. Saturated aqueous ammonium sulphate solution (100 ml.) was added and the product extracted into ethyl acetate. The dried extracts were evaporated to low bulk and triturated with petroleum ether (B.P. 40–60°). The resulting solid was filtered off, washed with petroleum ether and dried in vacuo to give 3-azidomethyl-7-(p-aminophenyloxamido)-ceph-3-em-4-carboxylic acid (0.70 g., 70% theory); $[\alpha]_D + 108$ (c., 0.5; pH 7 buffer);

$\lambda$ max. 344 nm. ($E_{1cm}^{1\%}$ 441), $\lambda$ max. 246 nm. ($E_{1cm}^{1\%}$ 371), $R_F$ 0.2 single spot, (ethyl acetate/n-butanol/pH 5 buffer system).

EXAMPLE 35

Sodium 3-azidomethyl-7β-(2'-methoximinophenyl-acetamido)ceph-3-em-4-carboxylate

7β - amino - 3 - azidomethylceph-3-em-4-carboxylic acid (2.55 g., 10 mmole.) was dissolved in a solution of sodium hydrogen carbonate (2.1 g., 25 mmole.) in water (40 ml.), and acetone (30 ml.) was added. This solution was cooled to 0–5°, and 16 ml. of 0.625 M N-methoxy-2-phenylimino-acetyl chloride in acetone (see copending application No. 712,962, Example 34) were added with stirring over a period of 1 min. The mixture was stirred for 15 min. when a further portion (4 ml.) of the above acid chloride solution was added. After a further 15 min. stirring, the acetone was removed, some precipitated solid was filtered off, and the aqueous solution was washed with ethyl acetate (2× 50 ml.), acidified to pH 2 with 2 N-hydrochloric acid and extracted with ethyl acetate (1× 100 and 2× 50 ml.). The combined extract was washed with water (50 ml.), dried and evaporated to a brown froth (2.8 g.). This froth was dissolved in acetone (10 ml.) and 10%-sodium 2-ethyl-hexanoate in acetone was added. The precipitated sodium salt (1.56 g.) was purified by solution in methanol and precipitation with isopropanol to give sodium 3-azidomethyl-7β-(2'-methoximinophenyl-acetamido)ceph-3-em-4-carboxylate (0.85 g., 19%), $[\alpha]_D + 75°$ (c. 1.04; H₂O), $\lambda_{max.}$ (pH 6 phosphate) 256 nm. ($\epsilon$ 17,900), $\nu_{max.}$ (Nujol) 2112, 1760, 1688, 1508 and 1605 cm.⁻¹, $R_f$ 0.69 (ethyl acetate/n-butanol/pH 5 buffer system at 37°) (probably a mixture of syn- and anti-forms).

The biological activities of the compounds described in the examples are given in the following table. Strain 663 is penicillin sensitive while Strains 604 and 3452 are penicillin resistant.

TABLE II

| Compound of Example No. | Tube dilution assay (γ/ml.) Staph aureus | | | Urinary recovery, percent oral admin to female rats | Mouse protection, ED$_{50}$/mg./kg., dose S. aureus Strain 663 subcutaneous |
| --- | --- | --- | --- | --- | --- |
| | Strain 663 | Strain 604 | Strain 3452 | | |
| 1 | 0.31 | 1.25 | 1.0 | 6.1 | 6.25 / [1] 12.5 |
| 2 | 0.62 | 2.5 | 1.0 | 2.9 | 37.5 |
| 3 | 0.31 | 2.5 | 4.0 | 6.0 | |
| 4 | 0.16 | 1.25 | 1.25 | 6.1 | 50 |
| 5 | 0.31 | 1.25 | <0.5 | 4.3 | ca. 50 |
| 6 | 0.08 | 0.31 | <0.5 | 23.0 | <6.0 |
| 7 | 2.5 | >2.5 | 16.0 | 5.9 | >50 |
| 8 | 0.08 | 0.61 | <0.5 | 7.7 | 40 |
| 9 | 0.03 | 0.62 | 2.0 | 7.6 | 6 |
| 10 | 0.04 | 0.31 | 1.0 | 3.8 | 6 |
| 11 | 2.5 | >2.5 | 16.0 | 12.7 | 25 |
| 12 | >2.5 | >2.5 | 8.0 | 5.05 | >50 |
| 13 | 0.08 | 1.25 | 4.0 | 13.9 | 6.0 |
| 14 | >2.5 | >2.5 | 16.0 | 9.6 | >50 |
| 15 | 0.08 | 0.31 | 2.0 | 12.1 | 9 |
| 16 | 0.31 | 2.5 | 4.0 | 40.25 | 30 |
| 17 | 0.04 | 0.6 | <0.5 | 15.5 | 18 |
| 18 | 1.25 | 2.5 | 8.0 | 26.5 | 37 |
| 19 | 0.04 | 0.16 | <0.5 | 17.2 | 18 |
| 20 | 0.6 | 2.5 | 2.0 | 36.1 | ca. 50 |
| 21 | 0.02 | 0.3 | <0.5 | 4.9 | ca. 6 |
| 22 | 1.25 | 2.5 | 4 | 9.9 | ca. 50 |
| 23 | 1.25 | 2.5 | 16 | 16.2 | 37.0 |
| 24 | 1.25 | 1.25 | 8 | 28.55 | ca. 50 |
| 25 | 0.6 | 1.25 | 2 | 29.3 | 20 |
| 26 | 2.5 | 2.5 | 4 | 9.0 | >50 |
| 27 | 1.25 | 0.31 | 4.0 | 18.25 | 37 |
| 28 | 0.02 | >2.5 | 4.0 | 6.6 | 12 |
| 29 | 0.62 | 1.25 | 4 | 4.7 | 18 |
| 30 | 0.62 | 1.25 | 4.0 | 6.6 | <6 |
| 31 | 0.62 | 1.25 | 4.0 | 4.3 | <6 |
| 32 | 0.04 | 0.3 | <0.5 | 2.0 | <6 |
| 33 | 2.5 | >2.5 | 125 | 0.78 | 20 |
| 34 | 0.31 | 0.31 | <0.5 | 4.3 | 12 |
| 35 | 0.3 | 0.6 | 1 | ca. 6 | ca. 50 |

[1] Oral.

The formulation of pharmaceutical preparations is illustrated in the following examples.

EXAMPLE A

Ointment (1) Sodium 3 - azidomethyl - 7 - (p - chlorophenylglyoxamido)ceph-3-em-4-carboxylate—5% w./w.
(2) Cetomacrogol 1000 B.P.C.[1]—6% w./w.
(3) Cetostearyl alcohol—24% w./w.
(4) Liquid paraffin—10% w./w.
(5) Soft paraffin to make up to 100 parts.

[1] Cetomacrogol 1000—a macrogol ether containing 20–24 oxyethylene groups in the polyoxyethylene chain.

2, 3, 4 and 5 were melted together and stirred to give a homogeneous base. The particle size of the active ingredient was reduced to about 10 microns or less and dispersed in the melted base at 40° C. The resulting ointment was refined by passage through an ointment mill.

EXAMPLE B

Injection

Sterile sodium 3 - azidomethyl - 7 - (p-chlorophenylglyoxamido) ceph-3-em - 4 - carboxylate was distributed aseptically into vials, each containing 250 mg., and sealed to exclude moisture and bacteria. The material was dissolved before use by the addition of sterile water to produce a 2 ml. injection.

EXAMPLE C

Intramammary preparation

Sodium 3 - azidomethyl - 7 - (p-chlorophenylglyoxamido) ceph-3-em-4-carboxylate—10% w./w.
White beeswax—2% w./w.
Arachis oil to make up to 100 parts.

The beeswax was dissolved in arachis oil and the sterilized mixture heated at 150° C. for 1 hour. The mixture was then cooled rapidly, with stirring, to room temperature and stored in a refrigerator overnight. The base was then subjected to slow planetary stirring and the active material was incorporated as a sterile microfine powder, giving a homogeneous mix of soft consistency.

The preparation was aseptically distributed into sterilized intramammary tubes so that 3 grams of the product might be extruded from each tube.

EXAMPLE D

Oral tablet

| | Mgm. |
| --- | --- |
| (1) 3 - azidomethyl - 7 - (p - chlorophenylglyoxamido)ceph-3 em - 4 - carboxylic acid | 250 |
| (2) Mannitol | 200 |
| (3) Potato starch | 47 |
| (4) Magnesium stearate | 3 |

1 and 2 were blended together and granulated with 3 as a 10% starch paste. The granules were passed through a No. 60 mesh (B.S.) screen, dried to constant weight, and sieved through a No. 16 mesh (B.S.) screen. The granules were then lubricated by blending in 4, and compressed on 7/16" punches at 500 mgm. per tablet.

The tablets may be coated if required, for instance with a readily soluble conventional film coating.

We claim:

1. A compound selected from the group consisting of a compound of the formula $$\text{Ar.}\overset{\alpha}{\text{C}}\text{O.CO.NH} \begin{array}{c} \\ \\ \end{array} \begin{array}{c} S \\ \\ \end{array} \text{CH}_2.\text{N}_3$$
$$\text{CO}_2\text{H}$$

in which Ar is a member selected from the group consisting of

[phenyl ring with $R_n$ substituent]

where R is selected from the group consisting of amino, formamido, loweralkanoylamido, mono-loweralkylamino, di-loweralkylamino, halo, lower alkyl, lower alkoxy, lower alkoxycarbonyl, nitro and cyano and $n$ is 0 or an integer from 1 to 4, naphthyl, phenanthryl, thienyl, furyl, pyrrolyl, dioxanyl, pyridyl and thiazolyl; pharmaceutically acceptable salts and α-carbonyl derivatives thereof, said derivatives being selected from the group consisting of the oxime, semicarbazone, thiosemicarbazone, isonicotinoylhydrazone, hydrazone and methoxime.

2. A compound as defined in claim 1 in which Ar represents a heterocyclic aromatic group selected from the group consisting of thienyl, furyl, pyrrolyl, dioxanyl, pyridyl and thiazolyl.

3. A compound as defined in claim 1 in which Ar represents said group of the formula

[phenyl ring with $R_n$ substituent]

4. A compound as defined in claim 1 in which Ar is selected from the group consisting of mono-, di- and trisubstituted phenyl, the substituents being selected from the group consisting of halogen, methoxy and nitro.

5. A compound as defined in claim 1 wherein said compound is selected from the group consisting of 3-azidomethyl-7-phenylglyoxamidoceph-3-em-4-carboxylic acid,
3-azidomethyl-7-(p-chlorophenylglyoxamido)-ceph-3-em-4-carboxylic acid,
3-azidomethyl-7-(p-bromophenylglyoxamido)-ceph-3-em-4-carboxylic acid,
3-azidomethyl-7-(m-chlorophenylglyoxamido)-ceph-3-em-4-carboxylic acid,
3-azidomethyl-7-(2′,5′-dichlorophenylglyoxamido)-ceph-3-em-4-carboxylic acid,
3-azidomethyl-7-(5′-chloro-2′-methoxyphenylglyoxamido)-ceph-3-em-4-carboxylic acid, 3-azidomethyl-7-(m-bromophenylglyoxamido)-ceph-3-em-4-carboxylic acid,
3-azidomethyl-7-(o-chlorophenylglyoxamido)-ceph-3-em-4-carboxylic acid,
3-azidomethyl-7-(o-bromophenylglyoxamido)-ceph-3-em-4-carboxylic acid,
3-azidomethyl-7-(p-nitrophenylglyoxamido)-ceph-3-em-4-carboxylic acid and
3-azidomethyl-7-(p-aminophenylglyoxyoxamido)-ceph-3-em-4-carboxylic acid.

References Cited

UNITED STATES PATENTS 3,338,896  8/1967  Takano et al. _____ 260—243C

NICHOLAS S. RIZZO, Primary Examiner

U.S. Cl. X.R.

424—246